United States Patent [19]
Rodgers

[11] Patent Number: 5,167,155
[45] Date of Patent: Dec. 1, 1992

[54] SUBMERSIBLE LIQUID LEVEL MEASURING SYSTEM AND METHOD OF USE

[75] Inventor: James C. Rodgers, Pipersville, Pa.

[73] Assignee: Betz Laboratories, Inc., Trevose, Pa.

[21] Appl. No.: 793,038

[22] Filed: Nov. 15, 1991

[51] Int. Cl.$^5$ ............................................. G01F 23/14
[52] U.S. Cl. ................................... 73/299; 73/290 R; 73/302
[58] Field of Search ................ 73/290 R, 290 V, 291, 73/299, 301, 302, 32 R, 438

[56] References Cited

U.S. PATENT DOCUMENTS

| | | | |
|---|---|---|---|
| 1,830,116 | 11/1931 | Kruft | 73/290 R |
| 2,286,919 | 6/1942 | McNeill | 73/299 |
| 3,421,538 | 1/1969 | Hembree | 73/299 |
| 4,154,103 | 5/1979 | Fling | 73/305 |
| 4,335,606 | 6/1982 | Michalak | 73/298 |
| 4,637,254 | 1/1987 | Dyben | 73/308 |
| 4,897,797 | 6/1990 | Free, Jr. et al. | 364/500 |

*Primary Examiner*—William A. Cuchlinski, Jr.
*Assistant Examiner*—G. Bradley Bennett
*Attorney, Agent, or Firm*—Caesar, Rivise, Bernstein, Cohen & Pokotilow, Ltd.

[57] ABSTRACT

A system (10) and methods of use for determining the level of a body of liquid (16), e.g., a chemical, in a storage tank, irrespective of the specific gravity of that liquid. The system (10) comprises a pressure transducer (22) and an elongated tubular, flexible sheath (24). An operating liquid (26) of lower specific gravity than the body of liquid (16) is disposed within the sheath (24). The transducer (22) is also disposed within the sheath adjacent the bottom end. The sheath (24) is immersed in the body of liquid (16) so that its top end (28) is above the liquid's surface. The pressure applied to the sheath (24) by the liquid (16) causes the sheath to collapse to a minimal internal cross sectional area, whereupon the operating liquid migrates up the sheath to form a very thin column (44). The operating liquid forming a pool (46) is located at the top of the very thin column (44). Thus, the sheath expands outward adjacent the surface (16A) of the body of liquid to retain that pool. The pressure transducer provides an electrical signal representing the pressure applied thereto by the combined height of the operating liquid column (44) and the operating liquid pool (46). This signal is used to calculate the height of the body of liquid (16). An air vent (52) is provided to vent the transducer to compensate for atmospheric pressure changes.

25 Claims, 3 Drawing Sheets

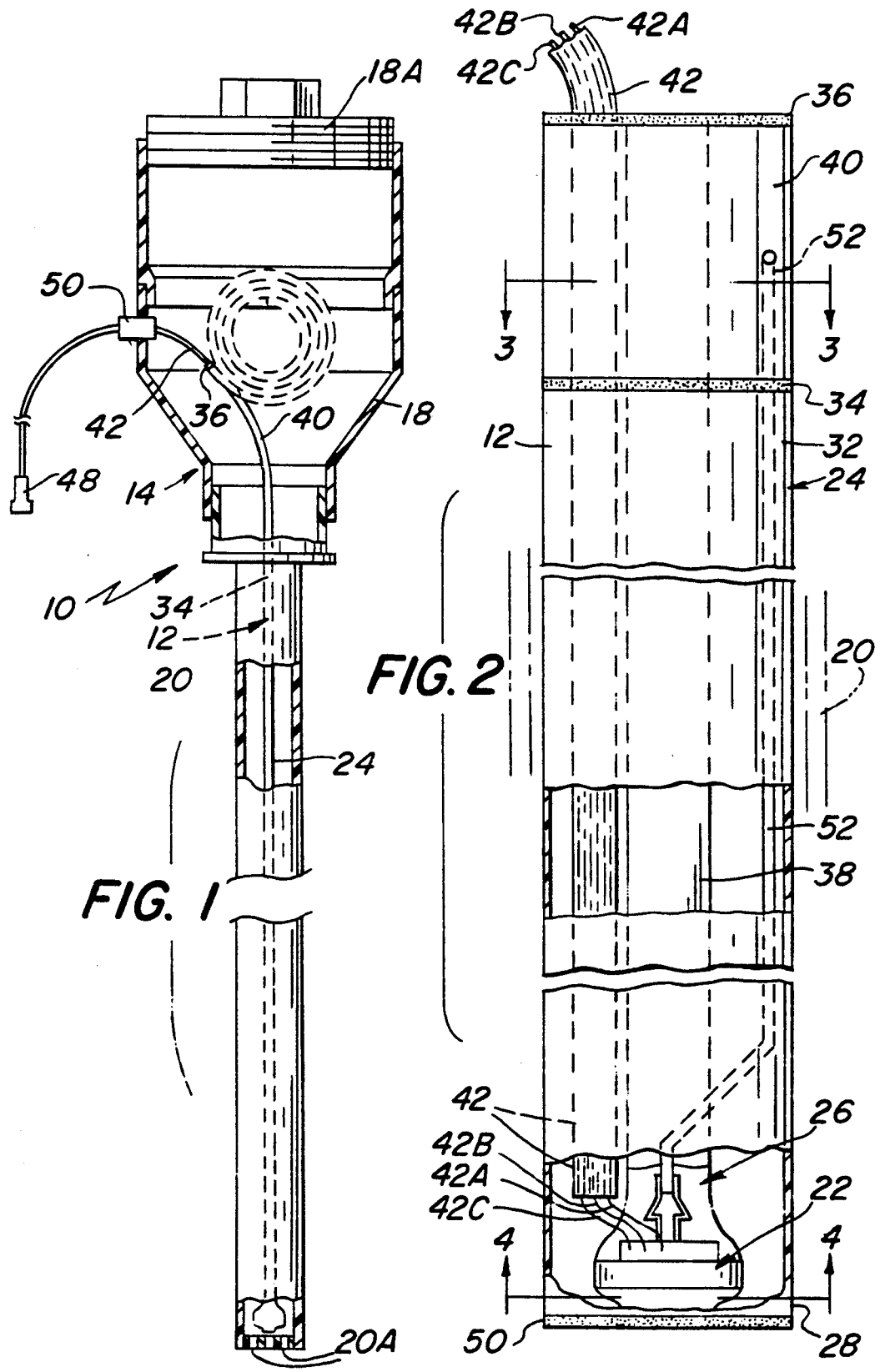

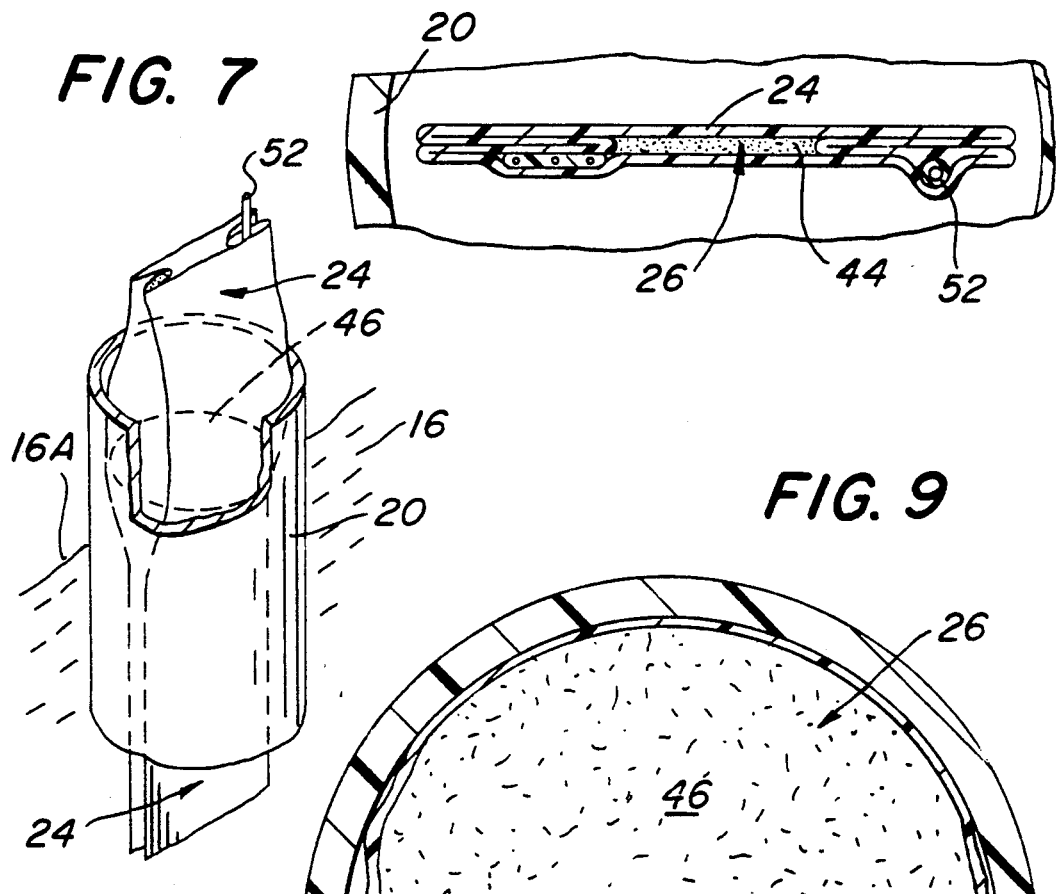
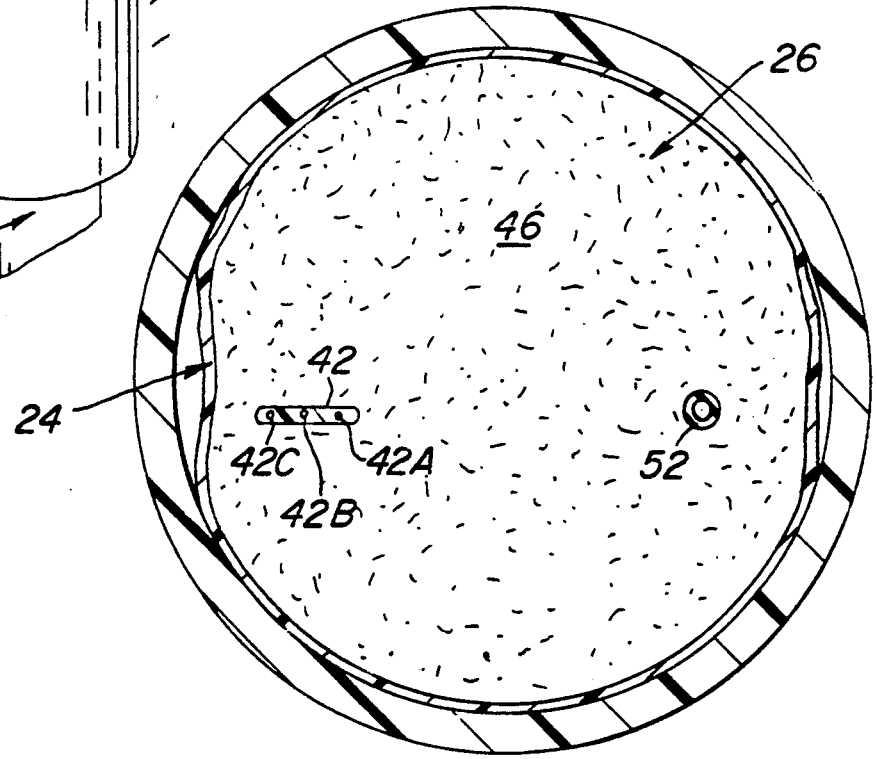

SUBMERSIBLE LIQUID LEVEL MEASURING SYSTEM AND METHOD OF USE

FIELD OF THE INVENTION

This invention relates generally to measuring systems, and more particularly to a submersible transducer system for determining the height of a body of a liquid, e.g., a liquid in a tank, well, clarifier, lagoon, etc., and a method of use of that system.

BACKGROUND ART

Determining the height or level of a body of liquid within a tank, lagoon, clarifier, etc., can be accomplished in various ways, depending upon the application. For example the height can be determined by direct measurement, e.g., immersion of a graduated rule into the liquid body. This is a common practice for determining the amount (volume) of a liquid, e.g., gasoline, stored in underground tanks. In cases where the liquid is stored in above ground tanks or other vessels it is a common practice to utilize a sight glass with the tank so that the liquid level within the sight glass (and which corresponds to the level within the tank) can be seen.

Indirect measuring systems have also been used in the prior art. One such type of system makes use of a pressure transducer arranged to be submersed at the bottom of the liquid within the body, tank, lagoon, etc., to provide an electrical output signal which represents the pressure produced on the transducer by the liquid. Using this signal, and knowing the specific gravity of the liquid, one can calculate or otherwise determine the height of the liquid (and from that information and with other information known calculate the volume of liquid in the body).

While such an indirect approach to liquid level measurement has advantages over direct measurement approaches for various applications, it nevertheless suffers from a significant drawback, namely, the specific gravity of the liquid must be known. Thus, this approach cannot be used in those applications where the specific gravity of the body of liquid is unknown or cannot be readily determined, thereby severely limiting its applicability.

There is a liquid level guaging device available which provides an electrical signal indicative of the height of a body of liquid irrespective of the specific gravity of that liquid. That device is sold under the trade designation METRITAPE by Metritape, Inc. of Littleton, Mass. The METRITAPE liquid level guaging device does not rely on liquid pressure measurement to determine the liquid's height. Rather it makes use of an elongated, somewhat complex, electrical circuit disposed within a compliant sheath. The sheath is arranged to be submerged vertically in the liquid to be measured so that the sheath extends from a predetermined point at or near the bottom of the tank to a point above the maximum height which the liquid may reach in the tank. The electrical circuit is configured and arranged so that the pressure applied to the sheath by the liquid causes the portion of the sheath disposed within the liquid to collapse, whereupon the electrical resistance of the submerged portion of the sheath changes in direct proportion to the height of the liquid. Accordingly, the electric output signal provided by the METRITAPE device represents the height of the liquid.

While the METRITAPE device appears generally suitable for its intended purposes, it leaves much to be desired from a number of standpoints, e.g., expense, complexity of construction, ruggedness, etc.

OBJECT OF THE INVENTION

Accordingly, it is a general object of this invention to provide a system and method of use which overcome(s) the disadvantages of the prior art.

It is a further object of this invention to provide a system and method of use for determining the height (level) of a body of liquid irrespective of the specific gravity thereof.

It is still a further object of this invention to provide a simple and low cost immersible system and method of use for determining the height of a body of liquid irrespective of the specific gravity thereof.

It is still a further object of this invention to provide an immersible system and method of use for instantaneously and accurately determining the height of a body of liquid irrespective of the specific gravity thereof.

SUMMARY OF THE INVENTION

These and other objects of this invention are achieved by providing a system and method of use for determining the height of a body of liquid irrespective of the specific gravity thereof. The system basically comprises pressure transducer means, a tubular member, and an operating liquid. The tubular member is formed of a flexible material and comprises an elongated sheath having a bottom end and a top end. The transducer is disposed within the sheath adjacent the bottom end thereof. The operating liquid has a known specific gravity which is less than that of the first liquid and is disposed within the sheath.

The sheath with the operating liquid therein being is immersed in the first liquid so that the top end thereof is above the surface of the first liquid. The pressure applied to the sheath by the first liquid causes the sheath to collapse to a minimal internal cross sectional area, whereupon the liquid migrates up the sheath to form a very thin column. The sheath expands outward adjacent the surface of the first liquid to exhibit a much larger internal cross sectional area thereat, whereupon the operating fluid forms a pool located at the top of the very thin column. The pressure transducer provides an output signal representing the pressure applied thereto by the combined height of the column and the pool.

BRIEF DESCRIPTION OF THE DRAWINGS

Other objects and many of the attendant advantages of this invention will readily be appreciated as the same becomes better understood by reference to the following detailed description when considered in connection with the accompanying drawings wherein:

FIG. 1 is a side elevational view, partially in section, of a system constructed in accordance with this invention shown prior to use;

FIG. 2 is an enlarged side elevational view of a portion of the system shown in FIG. 1;

Figure 6:
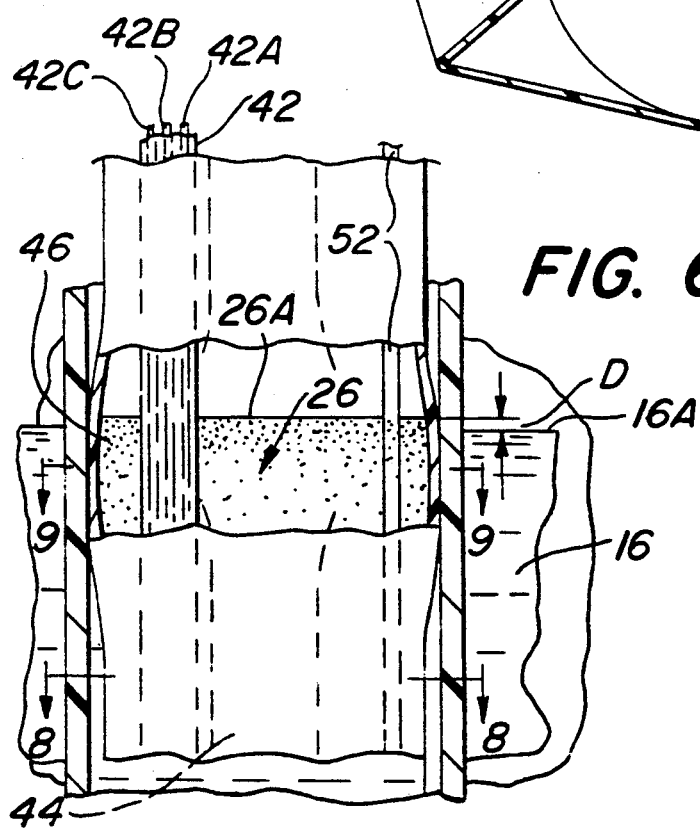

FIG. 6 is side elevational view of a portion of the system shown in FIG. 2 when the system is in use;

FIG. 7 is an isometric view of a portion of the system shown in FIG. 6 when the system is in use;

FIG. 8 is an enlarged sectional view taken along line 8—8 of FIG. 6; and

FIG. 9 is an enlarged sectional view taken along line 9—9 of FIG. 6.

DETAILED DESCRIPTION OF THE PREFERRED EMBODIMENT

Referring now in greater detail to the various figures of the drawings wherein like reference characters refer to like parts, a system embodying the present invention is generally shown at 10 in FIG. 1.

The system 10 basically comprises a liquid level sensing assembly 12 disposed within a housing assembly 14. The system 10 is arranged to be mounted on a tank (not shown) or some other support means (not shown) so that a portion of it (which will be described later) extends into the body of a liquid 16 (FIG. 6) whose height is to be determined (measured). The housing assembly 14 will be described in detail later. Suffice it for now to state that it includes a hollow cylindrical body 18 from which an elongated tube or pipe 20 projects.

As can be seen in FIG. 2 the level sensing assembly 12 basically comprises a pressure transducer 22, a sheath 24, and an operating liquid 26. The sheath is an elongated, tubular member formed of a thin, e.g., 2 mil, flexible material, e.g., polytetrafluoroethylene, so that it is very compliant. The sheath is of a sufficient length so that it can be extended from the bottom of the liquid 16 to a point above the maximum expected height or level of that liquid (for reasons which will be apparent later). In a preferred exemplary embodiment of this invention the sheath is 17 feet long to enable it to measure liquid levels up almost 17 feet deep. If larger measurements are required the sheath can be made longer.

The sheath 24 has a bottom end 28 formed by a transverse seal line 30. The seal line can be formed by any suitable means, e.g., heat. The top 32 of the sheath is sealed by a pair of transversly extending seal lines 34 and 36. The lower of those seal lines is designated by the reference number 34 and is located a short distance, e.g., 3 inches, below the seal line 36. The seal line 36 constitutes the top end of the sheath. The seal lines 34 and 36 may be formed by any suitable means. In the preferred embodiment they are each formed by a line of hot melt glue.

Since the sheath is an elongated member, the interior of the sheath between the bottom seal line 30 and the lower of the top seal lines, i.e., seal line 34, is an elongated hollow passageway 38. The interior of the sheath between the seal line 34 and the top seal line 36 forms an enclosed air space 40, whose function will be described later.

The transducer 22 is disposed within the sheath's passageway 38 adjacent the bottom seal 30. The transducer can be any suitable device which is arranged to provide an electrical output signal in response to the pressure applied thereto. In accordance with a preferred embodiment of this invention the pressure transducer is a model MPX5050 D 9130 unit, sold by Motorola, Inc. Electric power for the transducer is provided via a pair of electrical conductors 42A and 42B, with conductor 42A being grounded and 42B being at +5 VDC. A third conductor 42C carries the electrical output signal from the transducer. This signal is in the range of 0.5 to 4.5 VDC and represents a pressure range of 0 to 7.5 psi. The three conductors 42A, 42B, and 42C, preferably form a portion of a ribbon cable 42. The ribbon cable 42 extends from the transducer, through the sheath's passageway 38, through the seal line 34, through the air space 40, and through the seal line 36 to the interior of the body 18 of the housing assembly 14.

As shown in FIGS. 1 and 6-9 the sheath 24 is supported longitudinally within the elongated, vertically oriented pipe 20 of the housing assembly 14 so that it extends within the liquid 16 to be measured. Thus, it is advisable that the sheath be straight. To that end a weight (not shown) may be located below the transducer within the bottom of the sheath. In addition the cable 42 is preferably relative stiff, e.g., 22 guage, so that it acts as a stiffener to hold the sheath in a straight line. The pipe 20 is formed of any suitable, rigid and tough material, e.g., polyvinylchloride, and serves to protect the fragile sheath 24, from damage due to turbulence or debris which may be within the body of liquid 16.

As can be seen in FIG. 1 the sheath 24 extends through the lower portion of the body of the housing into the interior of the pipe 20 so that its lower end 28 is located at the bottom of the pipe. More particularly, the sheath is mounted so that the air space 40 is located above the highest position that the surface 16A (FIG. 6) of the liquid 16 could attain when the system 10 is mounted in the tank holding that liquid and so that the bottom end 28 of the sheath 24 is located at a known or predetermined height with respect to the bottom of the tank. The reason for such a mounting arrangement will become apparent later.

The pipe 20 includes a plurality of apertures 20A in its lower end so that when the system 10 is in place, as described above, with the pipe having the sheath therein immersed within the liquid 16 to be measured, that liquid will gain ingress into the interior of the pipe up to the level 16A.

As can be seen in FIG. 2 the operating liquid 26 is disposed within the interior of the sheath's passageway 38 so that it surrounds the pressure transducer 22. The manner by which the operating liquid 26 is introduced into the passageway 38 to surround the transducer will be described later. The operating liquid 26 has a known specific gravity which is less than that of the liquid 16 to be measured. Since the operating liquid surrounds the transducer 22 and is located within the sheath 24 it should be non-corrosive, non-conductive, and should not in any way interfere with the operation of the transducer. In accordance with a preferred embodiment of this invention the operating fluid is polydimethylsiloxane (silicone oil), such as sold by Dow Corning under the trade designation 200 fluid.

Figure 3:
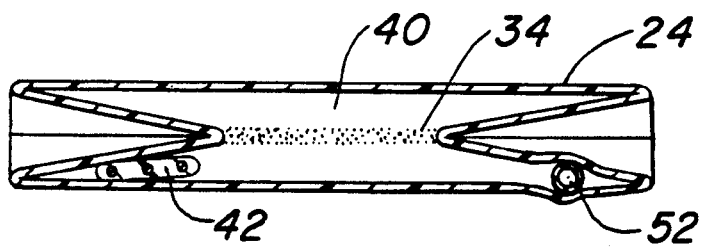
FIG. 3 is an enlarged sectional view taken along line 3—3 of FIG. 2.
Figure 5:
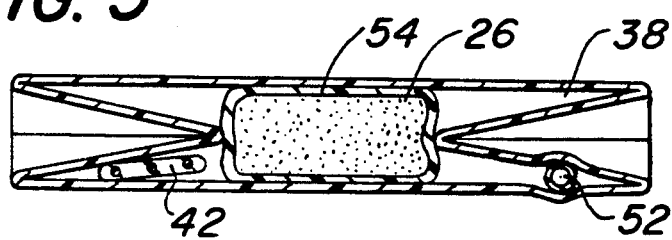
FIG. 5 is a sectional view similar to that of FIGS. 3 and 4 taken through a intermediate line above line 4—4 and showing a portion of the system of FIG. 1 prior to its use.
Figure 4:
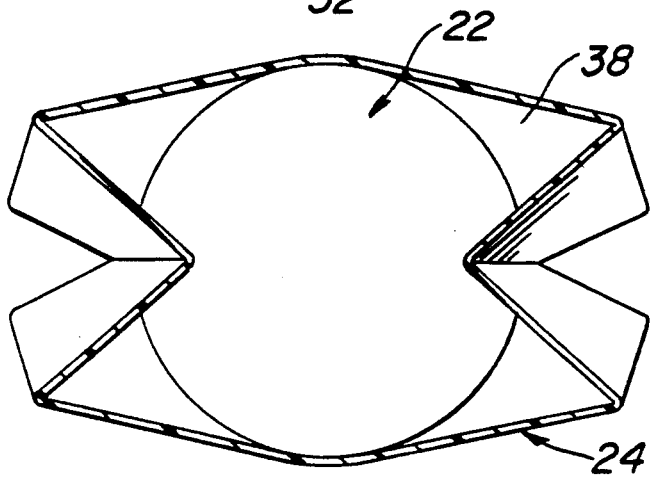
FIG. 4 is an enlarged sectional view taken along line 4—4 of FIG. 2.

As can be clearly seen in FIGS. 3-5 the sheath 24 is folded into a gussetted configuration. This factor coupled with the fact that the material making up the sheath is very flexible and compliant ensures that when the level sensing assembly 12 is immersed within the liquid 16, the liquid will collapse that portion of the sheath 24 extending into it as shown in FIG. 8. Since the operating liquid 26 has a lower specific gravity than liquid 16 the collapse of the sheath 24 causes the operating liquid 26 to migrate upward from the bottom of the passageway 38 (e.g., a position like that shown in FIG. 2) to a point 26A above the top surface 16A of the liquid 16, thereby forming a very thin column 44 of the operating liquid from the pressure transducer 22 up. At the top of the column 44 of the operating liquid adjacent the surface 16A, the sheath 24 spreads out or opens up, whereupon most of the operating liquid 26 forms a large diameter pool 46 (FIGS. 6, 7 and 9). As will be appreciated by those skilled in the art the pressure appearing on the pressure transducer 22 will be that provided by the combined height of the liquid column 44 and the liquid pool 46. Thus, the electrical output signal produced by the pressure transducer on conductor 42C will be proportional to the combined height of the liquid column 44 and liquid pool 46.

As can be seen clearly in FIG. 6 the top surface 46A of the liquid pool is virtually the same height as the top surface 16A of the liquid 16 to be measured. Thus, the signal provided by the pressure transducer 22 will be proportional to the height of the liquid 16. This signal is provided via an electrical connector 48 at the end of cable 42 to some externally mounted device (not shown) for a reason to be described later. The cable 42 extends out of housing 18 via a weathertight connector 50. In a preferred embodiment the weathertight connector 50 is a conventional component, such as that sold by Conxall Corporation of Villa Park, Ill., under the trade designation quick connect plug and socket, #89F4119 and #89F4100, respectively. Information developed by the externally mounted device, e.g., the volume of liquid in the tank, etc., can then be transmitted by the externally mounted device via a modem or some other means to a remote location.

As can be seen clearly in FIGS. 2, 3, and 5 a vent tube 52 is coupled to the pressure transducer 22 and extends upward through the passageway 38, through an opening in the seal line 34 and into the air space 40 where it terminates in fluid communication with the interior of that air space. The air space 40 being located within the flexible sheath is expandable and contractable. Thus, since the air space is located above the liquid level 16A changes in atmospheric pressure will cause the air space 40 to either expand or contract (depending upon the ambient air pressure at that time). This action automatically compensates for the effects of changing atmospheric pressure on the measurements provided by level sensing assembly 12.

It should be pointed out at this juncture that the use of sealed air space is not mandatory. Thus, the level sensing assembly 12 need not include air space 40. In such an alternative embodiment the air vent 52 would communicate directly with the ambient atmosphere to compensate for atmospheric pressure changes. However, such an arrangement is not preferred since debris may enter such an "open" system. Hence the system 10 utilizes the air space 40 having the top seal 36 to isolate it from the ambient surroundings, and thus prevent the ingress of debris and/or moisture into the system.

It should also be pointed out that the subject invention can also be used to determine the height of a liquid within a tank which is under relative pressure or vacuum, i.e., a tank in which the pressure above the liquid level (the pressure within the vapor phase space) is not at atmospheric pressure. Thus, the "ambient" pressure need not be the existing air pressure, but rather the pressure existing within the vapor phase space above the surface of the liquid.

As will, no doubt, be appreciated by those skilled in the art there is a difference in height (designated by the legend "D" in FIG. 6) between the top surface 46A of the measuring liquid pool 46 and the top surface 16A of the liquid to be measured. This height discrepancy "D" will necessarily result in some slight error in the measurement of the height of the liquid 16, but such an error is kept to a very small or minimum amount by virtue of the fact that only a very small amount of operating liquid 26 is utilized in the system. To that end, it is desirable that the amount of operating liquid used be kept to a minimum to minimize the measuring "error". For example, in the exemplary preferred embodiment of this invention the sheath is 3.5 inches in circumference, the length of the sheath is 17 feet, no more than 50 ml of the operating liquid is used. By further reducing the volume of the operating liquid, the measuring "error" can be further reduced. Moreover, since the amount of error can be readily determined, one can compensate for this error.

In accordance with a preferred aspect of this invention, the system 10 is modular in construction so that it can be readily assembled as the site of the liquid 16 to be measured. To that end, the system 10 is shipped in a "knocked-down" condition. In particular, the housing assembly body 18 is not connected to the pipe 20. Moreover, the sheath 24 is reeled up within the interior of the housing body 18 as shown by the phantom lines in FIG. 1. Further still, the operating liquid 26 is held within a rupturable pillow or packet 54 (FIG. 5) formed of any suitable plastic film disposed within the interior passageway 38 of the sheath adjacent the transducer 22.

The housing body 18 can be of any suitable construction, e.g., a standard plastic schedule 40 sewer pipe section having a standard 4 inch-to-2 inch reducer and a standard 2 inch-to-1 inch reducer.

To assemble the system 10, the sheath 24 is unreeled and oriented vertically. The pillow 54 is then ruptured by manually squeezing the portion of the sheath in which the pillow is located. This releases the operating liquid 26 from the pillow into the passageway 38, so that the operating liquid drops to the bottom of that passageway and surrounds the transducer 22 (as shown in FIG. 2). The sheath is then inserted within the pipe 20. In this regard it should be apparent to those skilled in the art that the length of the pipe 20 is selected so that it is consistent with the maximum expected depth of the body of liquid 16. Thus, with the exemplary embodiment disclosed herein the pipe can be any length up to approximately 17 feet. If the pipe is less than 17 feet the sheath 24 is partially reeled up within the housing body 18 to take up any excess over that which is necessary to extend the length of the pipe 20.

The pipe 20 is connected, e.g., threadedly secured, to the 2 inch-to-1 inch reducer of the housing body 18. A threaded cover or lid 18A (FIG. 1) is then secured onto the top of the body to seal off its interior. The system is now ready to be mounted in/on the tank, vessel, etc. in which the liquid 16 is located. This may be accomplished by inserting the pipe 20 through a conventional 1 inch bulkhead fitting (not shown) in the tank.

It should be pointed out at this juncture, that the system 20 can be used in various applications wherein it is desirable to know the height of a body of liquid. One such use is in the determination of the volume of liquid within a vessel. For such an application the signal representing the height of the liquid as provided by the transducer to the externally mounted device (not shown), is used by that device along with predetermined (stored) data, e.g., vessel volume, vessel shape, etc., to calculate the volume of liquid within the vessel. Moreover, since the system produces a real-time signal representing the instantaneous height of the liquid, the system 10 can be used in sophisticated control systems like that of U.S. Pat. No. 4,897,797 assigned to the same assignee as this invention. In particular, the system 10 of this invention can be used in the system of that patent in lieu of the two level sensors used therein to provide signals representing when the level of liquid in a chemical storage tank has dropped from the first height to a second height.

While the disclosed embodiment utilizes a gussetted sheath, other arrangements can be utilized to minimize the interior volume within the sheath 24 when pressure is applied thereto along length thereof by immersion within the liquid to be measured. By minimizing the space within the interior of the sheath, one can use a minimal amount of operating liquid, thereby resulting in a system which produces a minimal error due to the pooling action of the operating liquid slightly above the surface of the liquid to be measured.

While the principles of the invention have been described with regard to the particular embodiment, it is to be understood that the description is made by way of example only and not as a limitation on the scope of the invention which is set forth in the appended claims.

What is claimed is:

1. A system for determining the height of a body of a first liquid, said system comprising pressure transducer means, a tubular member, and an operating liquid, said tubular member being formed of a flexible material and comprising an elongated sheath having a bottom end and a top end, said transducer means being disposed within said sheath adjacent the bottom end thereof, said operating liquid being having a known specific gravity which is less than that of said first liquid, said operating liquid being disposed within said sheath, said elongated sheath with said operating liquid therein being arranged to be immersed in said first liquid so that said top end thereof is above the surface of said first liquid, whereupon the pressure applied to said sheath by said first liquid causes said sheath to collapse to a minimal internal cross sectional area, with said liquid migrating up said sheath to form a very thin column, said sheath expanding outward adjacent the surface of said first liquid to exhibit a larger internal cross sectional area, whereupon said operating fluid forms a pool located at the top of said very thin column, said pressure transducer being arranged to provide an output signal representing the pressure applied thereto by the combined height of said column and said pool.

2. The system of claim 1 wherein said pool has a top surface and wherein the volume of operating liquid used is sufficiently small so that the top surface of said pool is not appreciably higher than the top surface of said first liquid.

3. The system of claim 1 wherein said sheath is sealed by a first seal line adjacent said top end.

4. The system of claim 2 wherein said sheath is sealed by a first seal line adjacent said top end.

5. The system of claim 1 wherein said sheath includes a space located above the top surface of said first liquid and isolated from the ambient atmosphere.

6. The system of claim 1 wherein said system additionally comprises a vent tube coupled to said pressure transducer.

7. The system of claim 5 wherein said system additionally comprises a vent tube coupled to said pressure transducer, said vent tube communicating with the interior of said space to automatically compensate for ambient pressure of said ambient atmosphere.

8. The system of claim 7 wherein said sheath is sealed by a first seal line adjacent said top end, said sheath also comprising a second seal line located above said first seal line, said seal lines and said sheath defining therebetween said space.

9. The system of claim 1 wherein said transducer is located at a predetermined elevation within said first liquid when said sheath is immersed within said first liquid.

10. The system of claim 7 wherein said transducer is located at a predetermined elevation within said first liquid when said sheath is immersed within said first liquid.

11. The system of claim 1 wherein said sheath is gussetted.

12. The system of claim 1 wherein said sheath is formed of polytetrafluoroethylene.

13. The system of claim 1 wherein said operating liquid is polydimethylsiloxane.

14. The system of claim 1 wherein said sheath is mounted within an elongated, protective, tubular shell, said shell being in fluid communication with said body of first liquid.

15. The system of claim 14 wherein said shell comprises a relatively rigid pipe extending downward from a hollow body member.

16. The system of claim 15 wherein said sheath is initially reeled up within said hollow body member and then is unrolled and extended downward through said pipe.

17. The system of claim 17 wherein said operating liquid is initially located within a rupturable container located within said sheath, said container being arranged to be readily ruptured by the application of manual pressure thereto, whereupon said operating liquid is released into the interior of said sheath.

18. The system of claim 1 wherein said operating liquid is initially located within a rupturable container located within said sheath, said container being arranged to be readily ruptured by the application of manual pressure thereto, whereupon said operating liquid is released into the interior of said sheath.

19. The system of claim I wherein said output signal is an electrical signal.

20. The system of claim 19 wherein said electrical signal is provided via at least one electrical conductor to means for calculating the height of said body of liquid based on said output signal.

21. A method of determining the height of a body of a first liquid by use of an immersible level measuring system, said system comprising pressure transducer means, a tubular member, and an operating liquid, said tubular member being formed of a flexible material and comprising an elongated sheath having a bottom end and a top end, said transducer means being disposed within said sheath adjacent the bottom end thereof, said operating liquid being having a known specific gravity which is less than that of said first liquid, said operating liquid being disposed within said sheath, said method comprising immersing said elongated sheath with said operating liquid therein in said first liquid so that said top end thereof is above the surface of said first liquid, whereupon the pressure applied to said sheath by said first liquid causes said sheath to collapse to a very small internal cross sectional area and said liquid migrates up said sheath to forms a very thin column, said sheath expanding outward adjacent the surface of said first liquid to exhibit a much larger internal cross sectional area, whereupon said operating fluid forms a pool located at the top of said very thin column, said pressure transducer being arranged to provide an output signal representing the pressure applied thereto by the combined height of said column and said pool.

22. The method of claim 21 additionally comprising utilizing said output signal to calculate the height of said first liquid.

23. The method of claim 21 additionally comprising providing a vent for said pressure transducer to compensate for ambient pressure above said first liquid.

24. The method of claim 23 wherein said sheath includes an enclosed space located above the surface of said first liquid, and wherein said vent is coupled to said space.

25. The method of claim 24 wherein said ambient pressure is atmospheric pressure.

* * * * *